United States Patent
Dickey et al.

(10) Patent No.: US 9,292,512 B2
(45) Date of Patent: *Mar. 22, 2016

(54) MAKING PUBLISHER CONTENT AVAILABLE TO SPECIFIC USERS

(71) Applicant: Amazon Technologies, Inc., Reno, NV (US)

(72) Inventors: Lucas B. Dickey, Seattle, WA (US); Wenlin Ma, Seattle, WA (US); Johanna S. Olson, Bellevue, WA (US); Piragash Velummylum, Seattle, WA (US); James H. Wood, Seattle, WA (US); Korwin J. Smith, Seattle, WA (US); Christopher G. Emery, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/455,503

(22) Filed: Aug. 8, 2014

(65) Prior Publication Data

US 2014/0351224 A1   Nov. 27, 2014

Related U.S. Application Data

(63) Continuation of application No. 13/036,145, filed on Feb. 28, 2011, now Pat. No. 8,805,962.

(51) Int. Cl.

| | |
|---|---|
| G06F 15/16 | (2006.01) |
| G06F 17/30 | (2006.01) |
| H04N 21/45 | (2011.01) |
| H04N 21/84 | (2011.01) |

(52) U.S. Cl.
CPC .... *G06F 17/30017* (2013.01); *G06F 17/30371* (2013.01); *H04N 21/4532* (2013.01); *H04N 21/84* (2013.01)

(58) Field of Classification Search
USPC .................. 709/202, 203, 217, 219, 226, 229
See application file for complete search history.

(56) References Cited

U.S. PATENT DOCUMENTS

| | | | | |
|---|---|---|---|---|
| 6,473,847 | B1 * | 10/2002 | Kamiya .............. | G06F 12/1081 711/171 |
| 2009/0037963 | A1 * | 2/2009 | Murray ............. | G06F 17/30017 725/92 |
| 2009/0150553 | A1 * | 6/2009 | Collart ............. | G06F 17/30017 709/229 |
| 2009/0228664 | A1 * | 9/2009 | Borkenhagen ...... | G06F 12/0897 711/154 |
| 2011/0078325 | A1 * | 3/2011 | Vanover .................. | H04L 63/10 709/232 |
| 2011/0087603 | A1 * | 4/2011 | Garcia ............... | G06Q 30/0277 705/55 |
| 2011/0099519 | A1 * | 4/2011 | Ma ........................ | G06F 3/0482 715/811 |
| 2013/0111137 | A1 * | 5/2013 | Lin ..................... | G06F 9/30043 711/122 |

* cited by examiner

*Primary Examiner* — Liangche A Wang
(74) *Attorney, Agent, or Firm* — Thomas | Horstemeyer, LLP

(57) ABSTRACT

Disclosed are various embodiments for making publisher content available to specific users. A directory describing media items that are remotely stored is presented via a user interface. Selection information corresponding to a particular media item is received via the user interface. The media item is requested and received from another computing device. Consumption data is collected during consumption of the media item. The consumption data is sent to another computing device.

20 Claims, 8 Drawing Sheets

MAKING PUBLISHER CONTENT AVAILABLE TO SPECIFIC USERS

CROSS-REFERENCE TO RELATED APPLICATIONS

This application is a continuation of, and claims priority to, co-pending U.S. patent application entitled "MAKING PUBLISHER CONTENT AVAILABLE TO SPECIFIC USERS," filed Feb. 28, 2011, and assigned application Ser. No. 13/036,145, which is incorporated herein by reference in its entirety.

BACKGROUND

Digital media content is widely available for download to electronic devices. Users may, for example, select media titles by browsing at an online store or by visiting an electronic publisher's network site. Conventional download solutions rely on the user to select a media title of interest, although the user may be guided by reviews or recommendations.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to a virtual media storage client that presents a virtual file system interface to media titles stored in a remotely located user-specific media storage area. Each user-specific media storage area is populated with titles of possible interest to each particular user, based at least in part on each user's past consumption. As presented by the virtual media storage client, the media titles appear to be stored locally, but are actually remotely stored until the user begins to consume a particular title.

Figure 1:
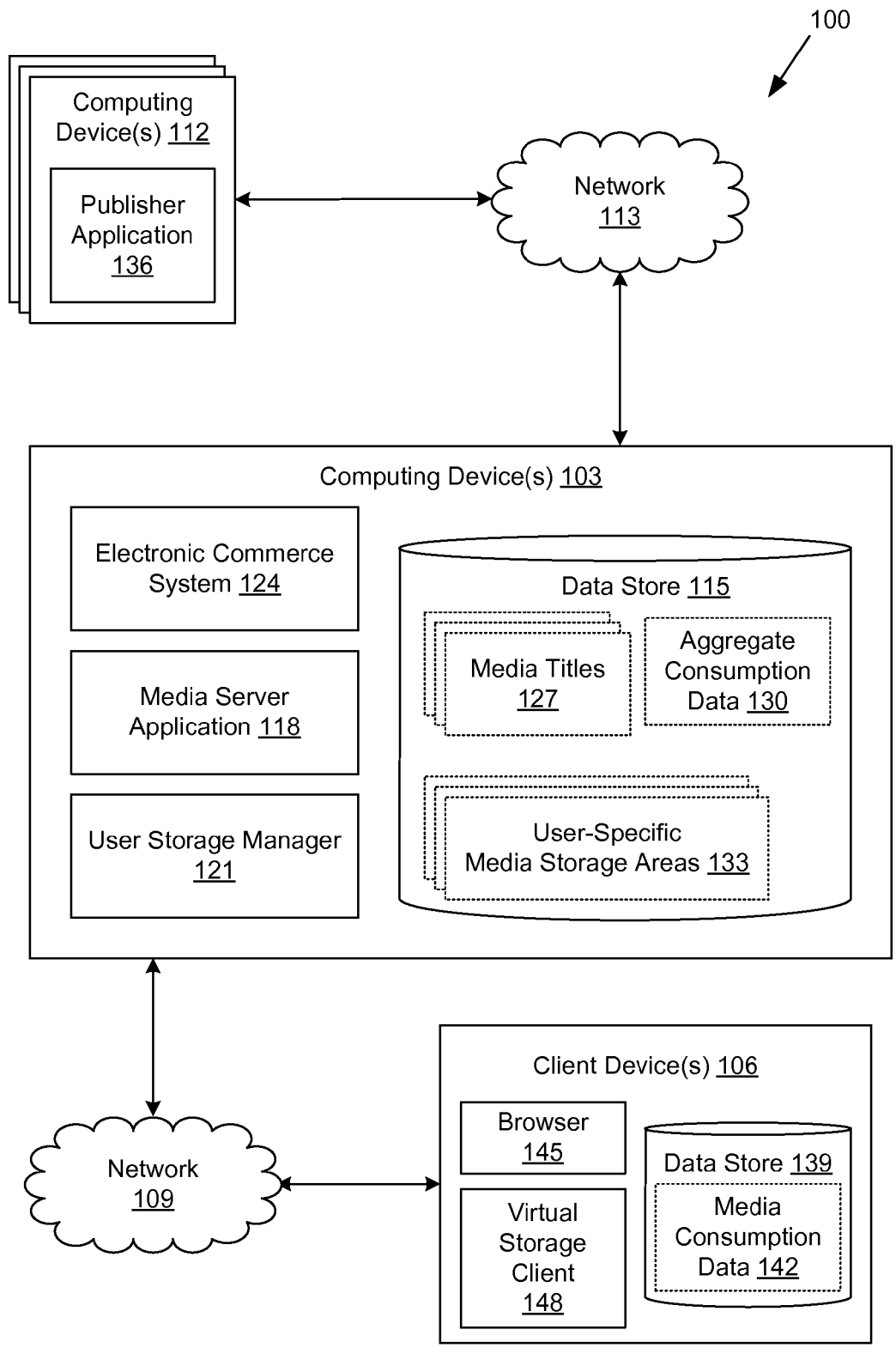
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more client devices 106 by way of a network 109. The network environment also includes one or more computing devices 112 in data communication with computing devices 103 by way of a network 113. Each of networks 109, 113 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below.

The components executed on the computing device 103, for example, include a media server application 118 and a user storage manager 121. Some embodiments of the computing device 103 also include an electronic commerce application 124. The components executed on the computing device 103 may also include other applications, services, processes, systems, engines, or functionality not discussed in detail herein. The data stored in the data store 115 includes data accessed by the media server application 118 and/or the user storage manager 121, for example, media titles 127, aggregate consumption data 130, and user-specific media storage areas 133, as well as potentially other data.

If present, the electronic commerce application 124 is executed to facilitate the online purchase of items from an electronic marketplace. The electronic commerce application also performs various backend functions associated with the online presence of the electronic marketplace in order to facilitate the online purchase of items.

The media server application 118 is executed to receive upload and download requests for media titles 127. The media server application 118 may also manage licenses for the media titles 127. The media titles 127 may include various types of digital media, for example, video, music, games, books, software, and/or any other media which can be transferred digitally.

The user storage manager 121 is executed to manage the user-specific media storage areas 133. A user-specific media storage area 133 can store one or more of the media titles 127 in the data store 115. A media title can be stored directly in the user-specific media storage area 133, or the user-specific media storage area 133 may instead contain a reference to a title stored in the media titles 127 of the data store 115.

The user storage manager 121 provides each client device 106 with a virtual file system interface layered on top of the user-specific storage areas 133. Thus, the user storage manager 121 allows a client device 106 to access the remotely-located storage area 133 and browse and view media titles 127 as if the content was stored locally.

The aggregate consumption data 130 includes data describing media consumption patterns by users of the client devices 106. Such data may be gathered from the client device 106 as a user views or consumes media titles 127 on a client device 106. Such information may also be gathered from the client device 106 as a user interacts with the electronic commerce application 124 to search for products, to view information about products, to select products for purchase, to purchase products, etc. The aggregate consumption data 130 does not contain information about specific users, but rather data about users in the aggregate.

The computing device 112 is representative of a plurality of computing devices that may be coupled to the network 109. The computing device 112 may comprise, for example, a processor-based system such as a computer system. Such a computer system may be embodied in the form of a desktop computer, a laptop computer, or other devices with like capability.

The computing device 112 may be configured to execute a publisher application 136. A publisher of media content may execute the publisher application 136 in a computing device 112, for example, to upload media titles 127 to the media server application 118 for later download to consumers via client devices 106. Metadata describing the media title is also uploaded by the publisher. The metadata may indicate an expiration date, after which the title is deleted from the computing device 112 and is thus no longer accessible to consumers.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability. The client device 106 includes a data store 139, which stores, for example, media consumption data 142 as well as potentially other data.

The client device 106 may be configured to execute various applications such as a browser 145, a virtual storage client 148, and other applications. The virtual storage client 148 provides a file system interface to the user-specific media storage area 133 stored on the computing device 103, by interacting with the user storage manager 121 executing on the computing device 103. The browser 145 may be executed in a client device 106, for example, to access and render network pages, such as web pages, or other network content served up by a web server, a page server, or other servers. The browser 145 may also render locally stored network pages, for example, pages generated by the virtual storage client 148. The client device 106 may be configured to execute applications beyond the browser 145 and the virtual storage client 148, such as, for example, email applications, instant message applications, and/or other applications.

Figure 2:
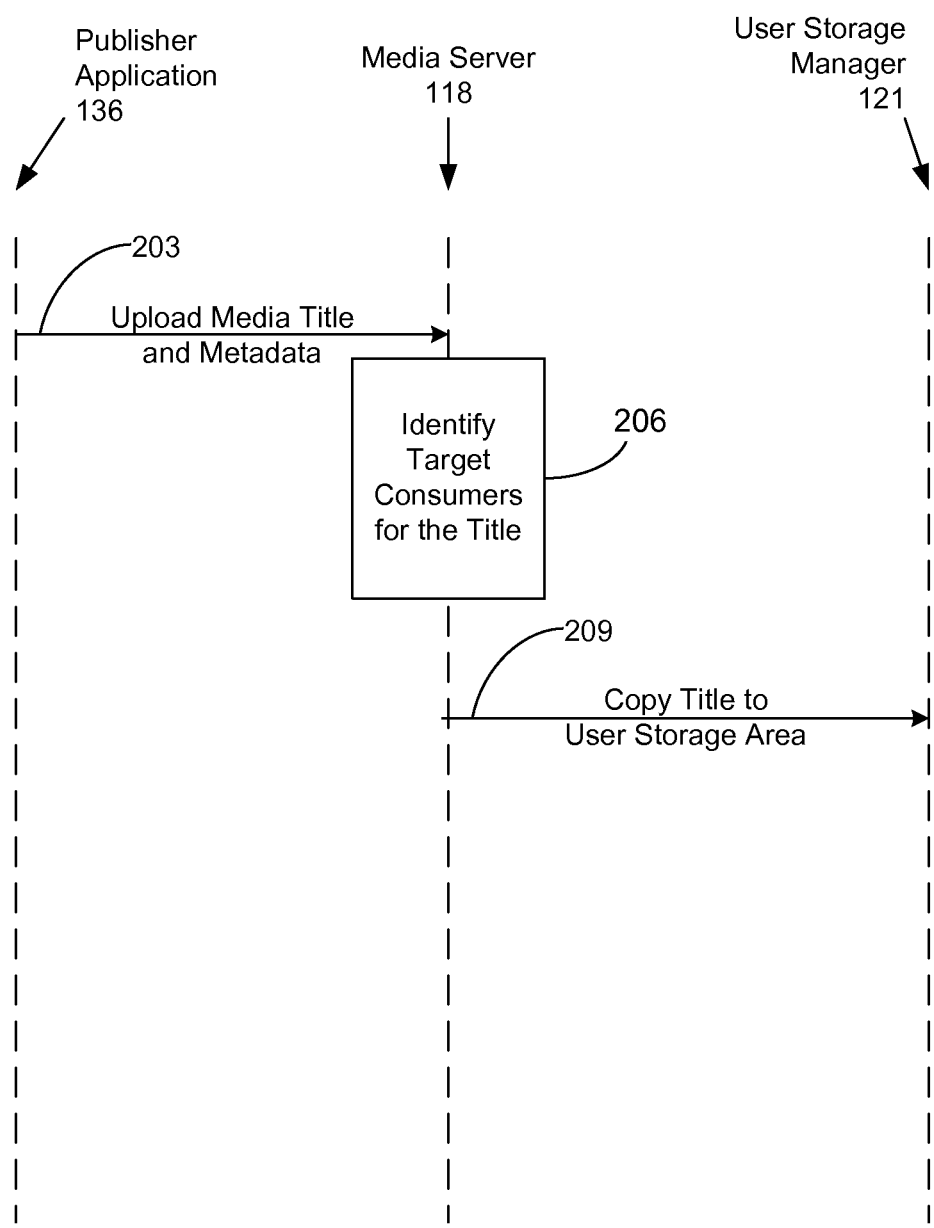
FIG. 2 is a diagram illustrating interaction between several computing devices in the networked environment of FIG. 1 and the computing device of FIG. 1.

Referring next to FIG. 2, a general description is provided for the operation of some of the components of the networked environment 100 of FIG. 1, according to various embodiments of the present disclosure. Specifically, FIG. 2 describes the interaction between the publisher application 136 and various components on the computing device 112. To begin, at event 203, a content publisher uses publisher application 136 executing on the computing device 112 to upload one or more media titles 127 to the media server application 118. Metadata describing each title is also uploaded. In addition to basic identifying information (e.g., title, artist/author, summary description, etc.), the metadata may include detailed information such as keywords which may aid in determining which consumers would be interested in the title. The metadata may also identify a category for the media title, and may provide information about how that category relates to others in a taxonomy. At box 206, the user storage manager 121 identifies target users for the newly uploaded media title (now stored as a media title 127 in the data store 115). The user storage manager 121 uses the aggregate consumption data 130 and the media title metadata to identify these target users. Having identified one or more target users, at event 209 the user storage manager 121 copies the newly uploaded media title 127 to the user-specific media storage area 133 associated with the target user.

At this point, users may access the media title 127 in the user-specific media storage area 133, via the virtual storage client 148 executing on the client device 106. If any of the media titles 127 uploaded by the publisher have an expiration time/date, then when that time/date is reached (at event 209), the expired media title 127 is deleted from the data store 115.

Figure 3:
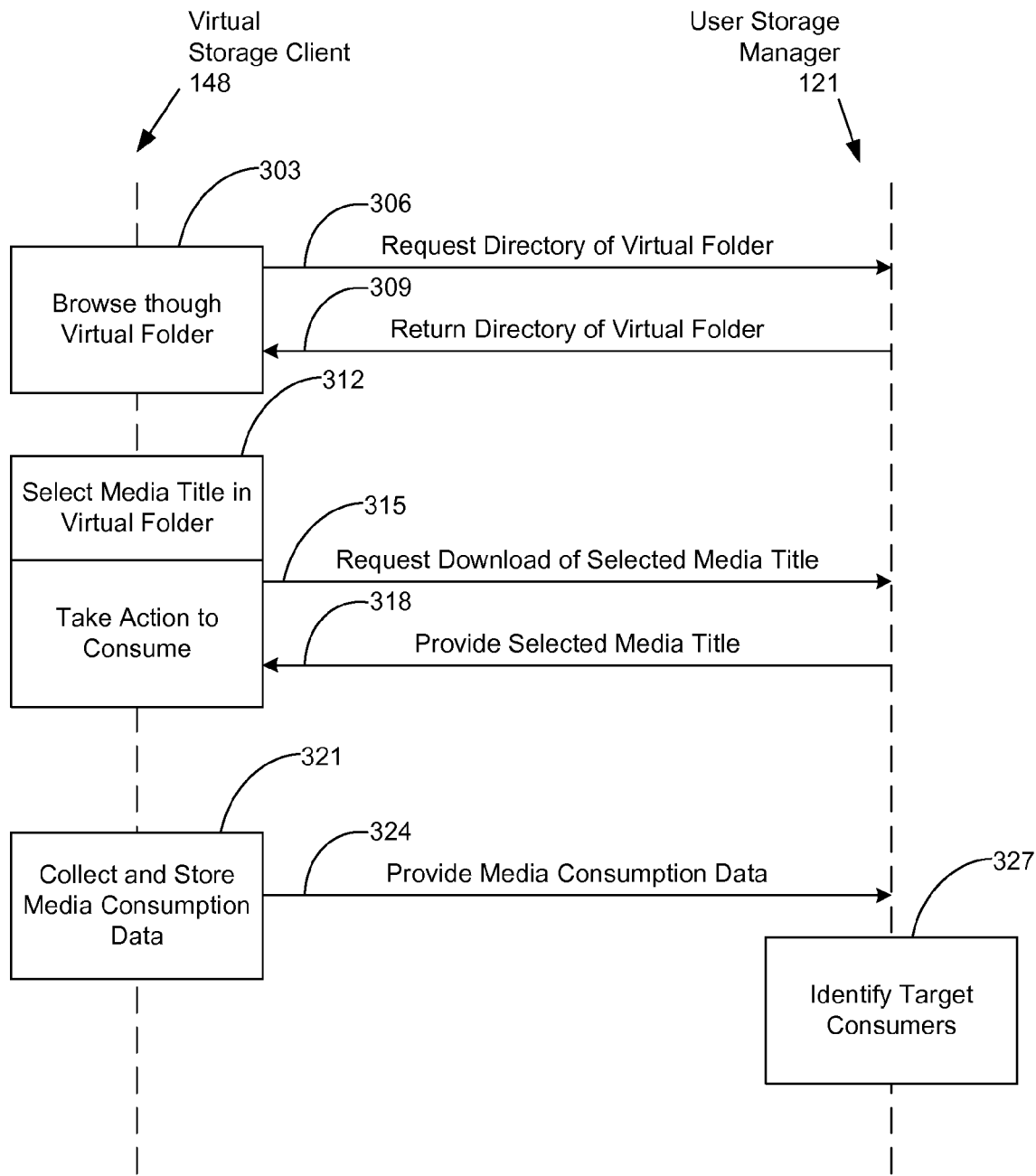
FIG. 3 is a diagram illustrating interaction between the client device and one of the computing devices in the networked environment of FIG. 1, according to various embodiments of the present disclosure.

Referring next to FIG. 3, a general description is provided for the operation of some of the components of FIG. 1, according to various embodiments of the present disclosure. Specifically, FIG. 3 describes the interaction between the virtual storage client 148 and various components on the client device 106. To begin, at box 303, a consumer browses or interacts with a folder presented by the virtual storage client 148. As noted above, the virtual storage client 148 interacts with the user storage manager 121 executing on the computing device 103 to present a file system interface to the remotely stored the user-specific media storage area 133, i.e., files in the user-specific media storage area 133 appear on a virtual drive and/or in virtual folder. The media titles 127 initially presented in the virtual folder at box 303 may be selected based on the user's purchase history, on aggregated purchase history of multiple users, and/or other suitable criteria. The media titles 127 may be arranged in a hierarchical manner, i.e., subfolders or subdirectories. In some embodiments, a subfolder may be specific to a content publisher, for example, the video game publisher Electronic Arts®. A subfolder may be specific to a media type, for example, video games appear in one subfolder, and movies appear in another subfolder. Some embodiments include a trial period subfolder, where media titles 127 in the trial period subfolder expire at a particular time/date and/or after a particular duration.

As a result of the consumer browsing to the virtual folder, at event 306 the virtual storage client 148 requests a directory or catalog of some or all of the media titles 127 stored in the user-specific media storage area 133. At event 309, the user storage manager 121 provides the requested directory within the user-specific media storage area 133. Next, at box 312 the consumer selects a media title 127 from one of the virtual folders and takes a media-type-specific action which consumes the media title 127. For example, if the media title 127 is a video title, the consumer action may invoke the Windows media player, while if the media title 127 is an electronic book, the consumer action may invoke an electronic book reader. The user's media consumption action results in the virtual storage client 148 making a request at event 315 to the user storage manager 121 to obtain a copy of the media title 127.

The user storage manager 121 responds, at event 318, by downloading the requested media title 127 to the virtual storage client 148. The virtual storage client 148 may store the downloaded media title 127 locally in the data store 139. In some embodiments, the virtual storage client 148 may handle payment and/or licensing transactions for the downloaded media title 127. Once the media title 127 is downloaded locally and the license is obtained, the media title 127 is presented to the user by an application program that is appropriate for the media type.

In some embodiments, the media consumption action may invoke a request to obtain additional information about the media title 127 including a preview of the media title 127, and in such cases, the user may be presented with the preview before actual consumption begins. In some embodiments, a preview action is explicitly provided to the user by the virtual storage client 148.

The consumption or playback features associated with the media title 127 depend on the license and the capabilities of the client device 106. In some embodiments, the consumer can consume part of the title, pause, and begin consumption again later.

As the user interacts with the virtual storage client 148 to browse, preview, and then consume media titles 127, the virtual storage client 148 collects and stores media consumption data 142 at box 321. The media consumption data 142 may include, for example, title identifier, title description, time/date of consumption; number of periods of consumption; application used for consumption, information about how the media title was obtained (e.g., downloaded, installed from disk, etc.), user identifier, etc. Thus, over time the media consumption data 142 provides a profile of a particular user's media consumption activities. The media consumption data 142 is provided by the virtual storage client 148 to the user storage manager 121 at event 324, either on request or periodically.

At box 327, the user storage manager 121 combines this user-specific data with the aggregate consumption data 130 to better identify potential target consumers for publishers, and to better identify media titles 127 that may be of interest to a particular consumer. As one example, a consumer who frequently plays first-person shooter video games might be a strong target consumer for a publisher with an upcoming release of a new first-person shooter game. As another example, a consumer who reads the electronic version of the Wall Street Journal might have an interest in receiving a trial electronic subscription to the New York Times. As yet another example, a consumer who reads periodicals electronically might also be interested in reading books electronically, and might be interested in reading sample chapters from the New York Times best seller list. Having identified media titles 127 that may be of interest to the consumer, the user storage manager 121 at the computing device 103 can then populate the user-specific media storage area 133 with such titles so that the consumer sees these titles when browsing the virtual folder.

Figure 4:
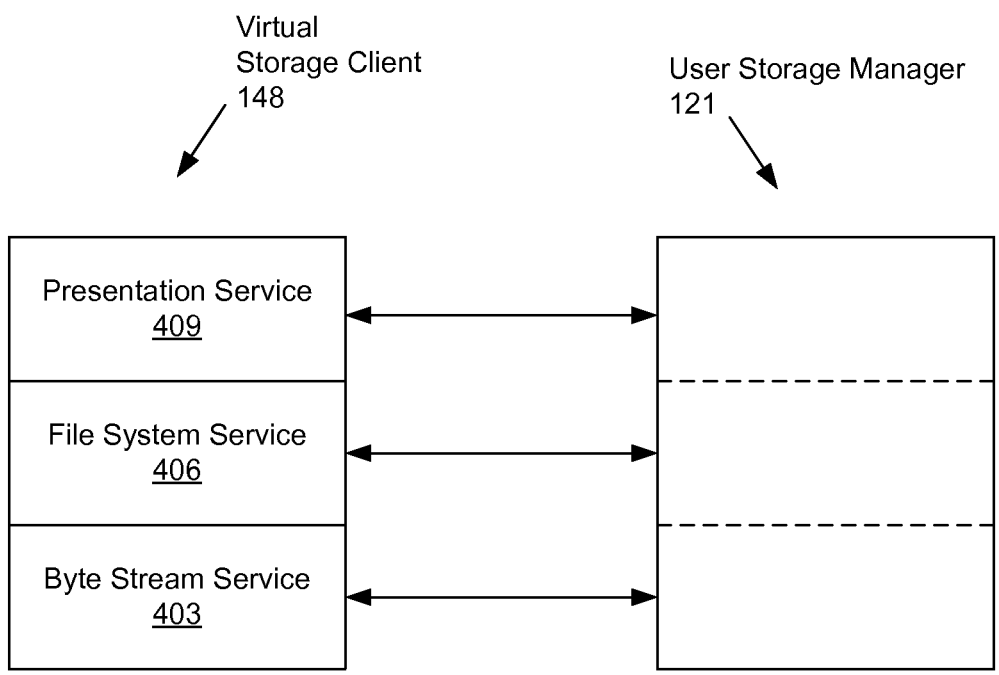
FIG. 4 is a block diagram showing the virtual storage client of FIG. 1 in further detail, according to various embodiments of the present disclosure.

Moving on to FIG. 4, shown is a block diagram illustrating the virtual storage client 148 in further detail, according to some embodiments. The virtual storage client 148 includes three tiers or layers of services. At the bottom layer, a byte stream service 403 interacts with the user storage manager 121 executing on the computing device 103 to receive a stream of bytes representing a media title 127. In some embodiments, the byte stream service 403 implements a Get/Put interface.

Above the byte stream service 403, a file system service 406 uses the services of the byte stream service 403 to implement a file system interface, for example, calls such as Open, Read, Write, Close, and Directory. With the file system interface implemented locally, the user storage manager 121 can be unaware of, and agnostic to, details about the file systems used by various types of clients.

At the top layer, a presentation service 409 can provide another view of the media titles 127 available in the user-specific media storage area 133. Such a view need not be limited to the file system abstraction, but can use an entirely different metaphor. For example, the presentation service 409 could provide a store or marketplace view of the user-specific media storage area 133, in which the user-specific media storage area 133 looks and feels like an electronic commerce site, but where the content presented is limited to the content in the user-specific media storage area 133. To implement a store view, the presentation service 409 may use extensive metadata available along with the media titles 127, for example, category and subcategory information, keyword information, etc. The store view may be implemented, for example, using a hierarchy of network site pages, such that the presentation service 409 in effect acts like a local network page server.

Figure 5:
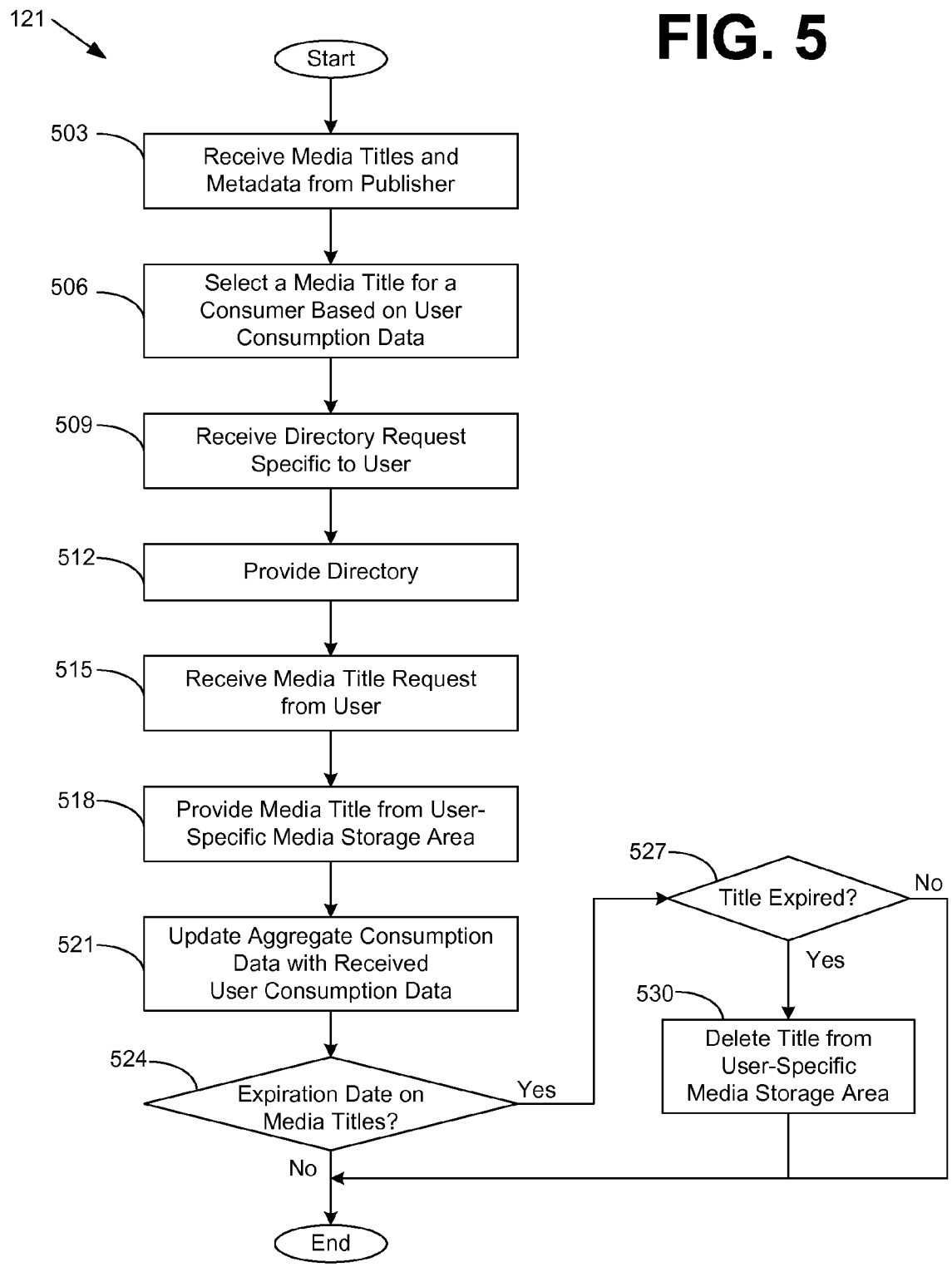
FIG. 5 is a flowchart illustrating an example of functionality implemented as portions of a user storage manager executed in a computing device in the networked environment of FIG. 1, according to various embodiments of the present disclosure.

Turning now to FIG. 5, shown is a flowchart that provides one example of the operation of a portion of the user storage manager 121 according to various embodiments. It is understood that the flowchart of FIG. 5 provides merely an example of the many different types of functional arrangements that may be employed to implement the operation of the portion of the user storage manager 121 as described herein. As an alternative, the flowchart of FIG. 5 may be viewed as depicting an example of steps of a method implemented in the computing device 103 (FIG. 1) according to one or more embodiments.

Beginning at box 503, the user storage manager 121 receives multiple media titles 127 and associated metadata from one or more content publishers. Next at box 506, the user storage manager 121 selects one of the received media titles 127 for a particular media consumer, based at least in part on consumption data that is specific to that user. The user storage manager 121 then associates the selected media titles 127 with the particular user, indicating that the selected media titles 127 may be of interest to the particular user. In some embodiments, this association may be implemented by copying the selected media titles 127 to the user-specific storage area 133. In other embodiments, this association may be implemented by storing in the user-specific storage area 133 a reference to a selected media title 127, with the file actually containing the selected media title 127 being stored elsewhere in the computing device 103 or the media server application 118. In some embodiments, this reference may take the form of a symbolic link.

At box 509, the user storage manager 121 receives a request from a virtual storage client 148 on behalf of a particular user. The request at box 509 is a request to obtain a directory of files within the user-specific media storage area 133 that is specific to the requesting user. Next, at box 512 the user storage manager 121 provides the requested directory. At box 515, the user storage manager 121 receives a request from a virtual storage client 148 for one of the media titles 127 stored within the user-specific media storage area 133. Next, at box 518 the user storage manager 121 retrieves the requested file from the user-specific media storage area 133 and provides it to the requesting virtual storage client 148. At box 521, the user storage manager 121 receives media consumption data from the virtual storage client 148 and uses it to update the aggregate consumption data 130.

At box 524 the user storage manager 121 determines whether any of the media titles 127 stored within any of the user-specific media storage areas 133 has an expiration date. If at box 524 it is determined that a media title 127 has an expiration date, then at box at box 527, the user storage manager 121 determines whether the title has expired, based on the expiration date. If at box 527 it is determined that the title has expired, then the user storage manager 121 deletes the title from the user-specific media storage area 133 at box 530. The process of FIG. 5 is then complete. Other actions may be taken to mark the title as expired, for example, updating a license file or digital rights management data associated with the title, updating an expiration date stored within the title itself, and/or other mechanisms to mark the title as expired, as should be appreciated.

Figure 6:
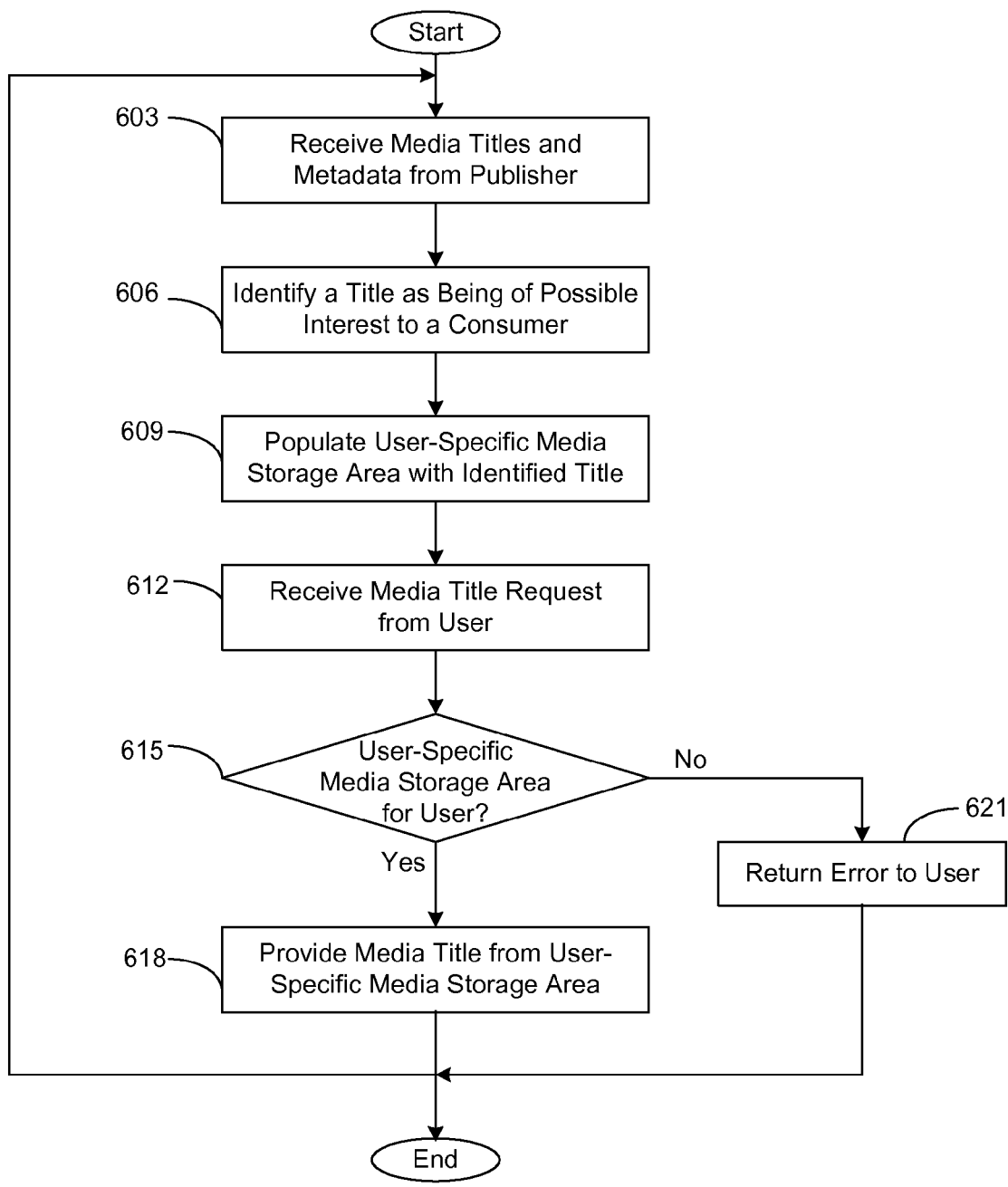
FIG. 6 is a flowchart illustrating another example of functionality implemented as portions of a user storage manager executed in a computing device in the networked environment of FIG. 1, according to various embodiments of the present disclosure.

With reference now to FIG. 6, shown is a flowchart that provides one example of the operation of a portion of the user storage manager 121 according to various embodiments. It is understood that the flowchart of FIG. 6 provides merely an example of the many different types of functional arrangements that may be employed to implement the operation of the portion of the user storage manager 121 as described herein. As an alternative, the flowchart of FIG. 6 may be viewed as depicting an example of steps of a method implemented in the computing device 103 (FIG. 1) according to one or more embodiments.

Beginning at box 603, the user storage manager 121 receives multiple media titles 127 and associated metadata from one or more content publishers. Next at box 606, the user storage manager 121 identifies one of the media titles 127 as being of possible interest to a particular media consumer, based at least in part on media consumption data that is specific to that consumer. At box 609, the user storage manager 121 populates the user-specific media storage area 133 for that media consumer with the identified media title 127. At box 612, the user storage manager 121 receives a request for a media title 127 from a virtual storage client 148. At box 615, the user storage manager 121 determines whether the requesting client is one having a user-specific media storage area 133. If at box 615 it is determined that the requesting client has a user-specific media storage area 133, the user storage manager 121 obtains the media title 127 and provides the title to the requesting virtual storage client 148 at box 618. If at box 615 it is determined that the requesting client does not have a user-specific media storage area 133, the user storage manager 121 returns an error code to the virtual storage client 148 at box 621. The process of FIG. 6 then repeats to process additional communications with content publishers and virtual storage clients 148.

Figure 7:
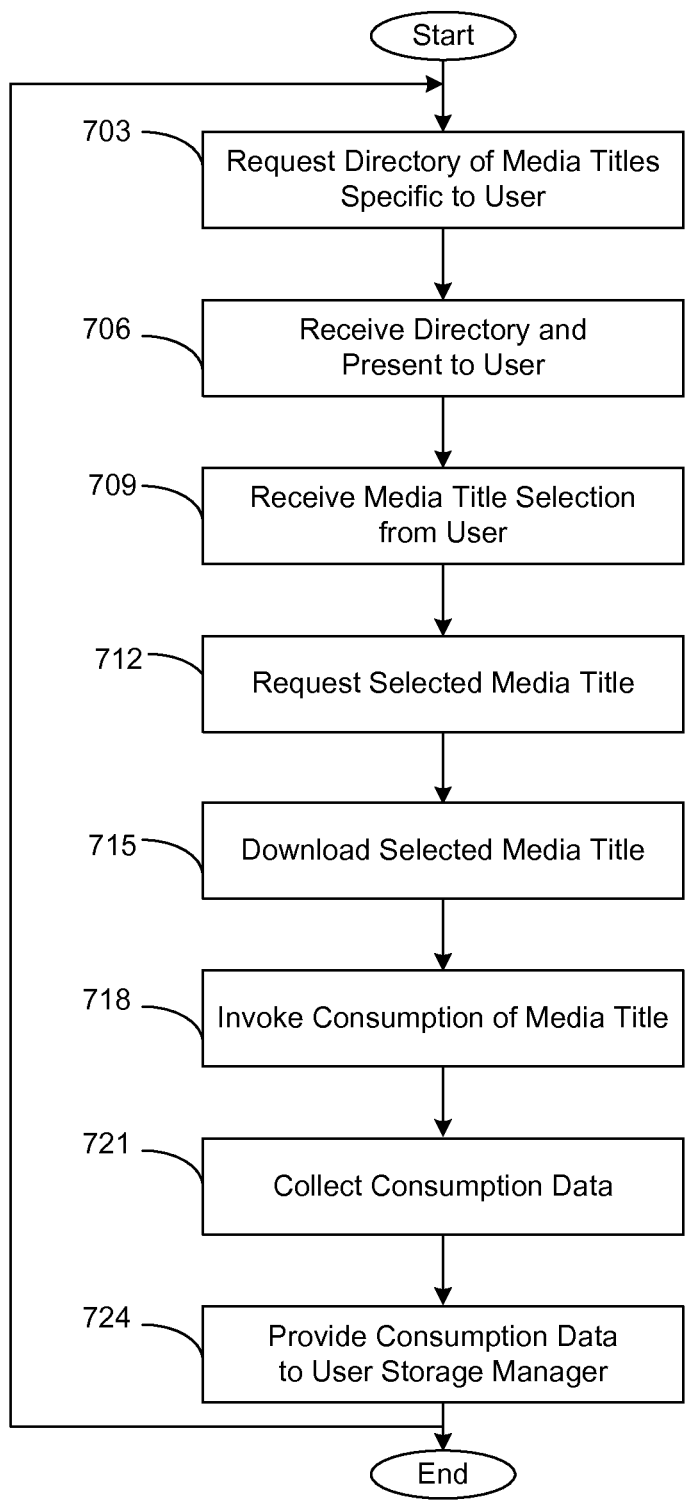
FIG. 7 is a flowchart illustrating yet another example of functionality implemented as portions of a virtual storage client executed in a computing device in the networked environment of FIG. 1, according to various embodiments of the present disclosure.

Turning now to FIG. 7, shown is a flowchart that provides one example of the operation of a portion of the virtual storage client 148, according to various embodiments. It is understood that the flowchart of FIG. 7 provides merely an example of the many different types of functional arrangements that may be employed to implement the operation of the portion of the virtual storage client 148 as described herein. As an alternative, the flowchart of FIG. 7 may be viewed as depicting an example of steps of a method implemented in the client device 106 (FIG. 1) according to one or more embodiments.

Beginning at box 703, the virtual storage client 148 requests a directory of media titles 127 from the user storage manager 121. At box 706, the virtual storage client 148 receives the requested directory and presents the directory to the user via a virtual file system interface. Next, at box 709, the virtual storage client 148 receives a user selection of one of the media titles 127 from the directory. At box 712, the virtual storage client 148 requests a download of the user-selected media title 127 from the user storage manager 121. At box 715, the virtual storage client 148 downloads the user-selected media title 127. At box 718, the virtual storage client 148 invokes a media playback application to consume the downloaded media title 127. At box 721, consumption data is collected as the media title 127 is consumed. At box 724, the virtual storage client 148 provides the collected consumption data to the user storage manager 121. In other embodiments, the consumption data is collected by the operating system, by a device driver, by a media device other than, but in communication with, the client device 106, and/or or other suitable arrangements.

Figure 8:
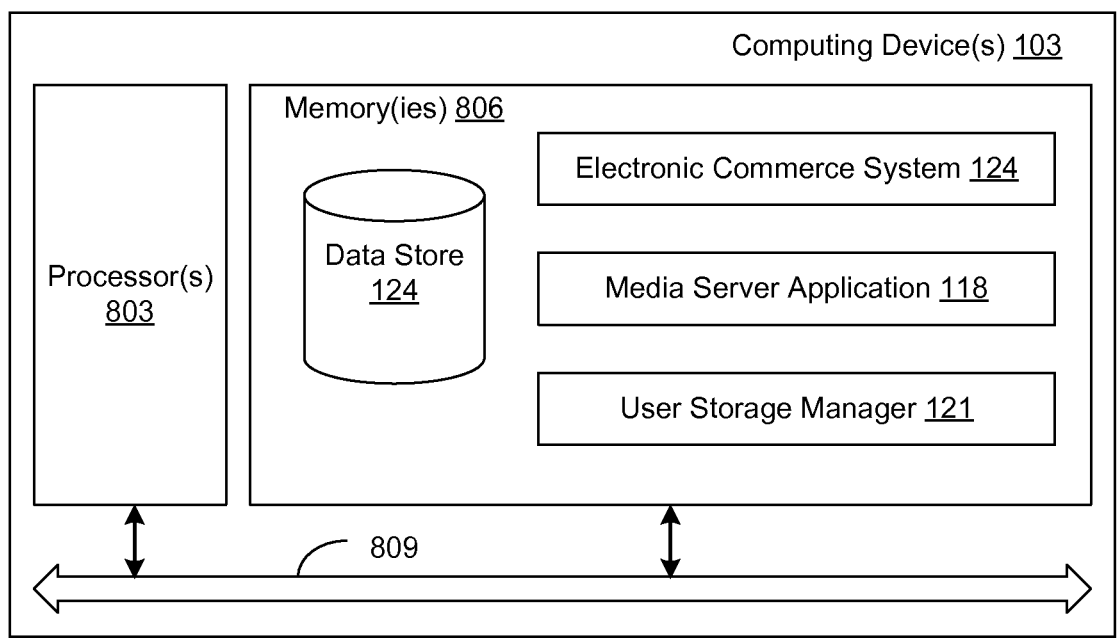
FIG. 8 is a schematic block diagram that provides one example illustration of a computing device employed in the networked environment of FIG. 1, according to various embodiments of the present disclosure.

Moving on to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the user storage manager 121, the media server application 118, and potentially other applications. Also stored in the memory 806 may be a data store 115 and other data. In addition, an operating system may be stored in the memory 806 and executable by the processor 803. While not illustrated, the computing device 112 and the client device 106 also include components like those shown in FIG. 8, whereby the virtual storage client 148 and the publisher application 136 are stored in respective memories and executable by respective processors.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors and the memory 806 may represent multiple memories that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the user storage manager 121, the media server application 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5, 6, and 7 show the functionality and operation of an implementation of portions of the user storage manager 121 and the virtual storage client 148. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5, 6, and 7 show a specific order of execution, it is understood that the order of execution may differ from that which is depicted. For example, the order of execution of two or more blocks may be scrambled relative to the order shown. Also, two or more blocks shown in succession in FIGS. 5, 6, and 7 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the user storage manager 121 and the media server application 118, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A non-transitory computer-readable medium embodying a program executed by a computing device, wherein, when executed, the program causes the computing device to at least:

present, via a user interface, a directory describing a plurality of media items that are stored via at least one other computing device, at least one of the plurality of media items being selected based at least in part on prior consumption data from a prior consumption of at least one previously consumed media item;

receive, using the user interface, selection information corresponding to a media item of the plurality of media items;
  request and receive the media item from the at least one other computing device;
  collect new consumption data during consumption of the media item; and
  send the new consumption data to the at least one other computing device, the new consumption data used to identify another media item of interest.

2. The non-transitory computer-readable medium of claim 1, wherein the at least one other computing device is configured to at least:
  identify a media item of interest based at least in part on the new consumption data; and
  add the media item of interest to the directory.

3. The non-transitory computer-readable medium of claim 1, wherein the user interface is configured to present the directory as if the plurality of media items were locally stored via the computing device.

4. The non-transitory computer-readable medium of claim 1, wherein the directory is specific to a particular user.

5. The non-transitory computer-readable medium of claim 1, wherein the new consumption data includes at least one of:
  a time of consumption of the media item,
  a number of periods of consumption for the media item,
  an identifier of an application used for the consumption of the media item, or
  an identifier of a user associated with the consumption.

6. The non-transitory computer-readable medium of claim 1, wherein an expired media item of the plurality of media items is removed from the directory upon expiration.

7. The method comprising:
  identifying, by at least one computing device, a media item of interest based at least in part on consumption data specific to a user, the consumption data corresponding to a consumption of one or more previously consumed media items;
  adding, by the at least one computing device, the media item of interest to a folder associated with the user;
  determining, by the at least one computing device, that a client associated with the user has requested the media item of interest;
  sending, by the at least one computing device, the media item of interest to the client;
  receiving, by the at least one computing device, additional consumption data from the client indicating consumption of the media item of interest;
  updating, by the at least one computing device, the consumption data based at least in part on the additional consumption data; and
  identifying, by the at least one computing device, another media item of interest based at least in part on the updated consumption data.

8. The method of claim 7, wherein the media item of interest is associated with metadata indicating an expiration, and the method further comprises:
  determining, by the at least one computing device, that the media item of interest has expired according to the expiration; and
  removing, by the at least one computing device, the media item of interest from the folder.

9. The method of claim 7, further comprising sending, by the at least one computing device, a listing of items included in the folder to the client, the listing of items comprising a plurality of media items.

10. The method of claim 7, wherein identifying the media item of interest further comprises identifying, by the at least one computing device, the media item of interest further based at least in part on aggregated consumption data that indicates consumption of media items by a plurality of other users.

11. The method of claim 7, wherein identifying the media item of interest further comprises identifying, by the at least one computing device, the media item of interest further based at least in part on metadata associated with the media item of interest that identifies a category for the media item of interest.

12. The method of claim 7, wherein adding the media item of interest to the folder associated with the user further comprises:
  storing, by the at least one computing device, a new copy of the media item of interest in a data store; or
  storing, by the at least one computing device, a new reference in the data store to an existing copy of the media item of interest.

13. The method of claim 7, wherein the additional consumption data identifies a plurality of periods of consumption of the media item of interest.

14. A system, comprising:
  at least one computing device; and
  at least one application executable in the at least one computing device, wherein, when executed, the at least one application causes the at least one computing device to at least:
    determine that a client has requested a listing of items included in a folder, the folder being specific to a user associated with the client;
    identify a media item of interest based at least in part on consumption data associated with the folder, the consumption data corresponding to a consumption of one or more previously consumed media items;
    automatically incorporate the media item of interest in the listing of items;
    send the listing of items to the client;
    determine that the client has requested the media item of interest;
    send the media item of interest to the client;
    receive additional consumption data from the client indicating consumption of the media item of interest;
    update the consumption data based at least in part on the additional consumption data; and
    identify another media item of interest based at least in part on the updated consumption data.

15. The system of claim 14, wherein the media item of interest is automatically incorporated in a subfolder of the folder, the subfolder corresponding to a plurality of media items that expire after a trial period.

16. The system of claim 14, wherein, when executed, the at least one application further causes the at least one computing device to at least issue a license for the media item of interest.

17. The system of claim 14, wherein, when executed, the at least one application further causes the at least one computing device to at least:
  determine that the media item of interest has expired; and
  remove the media item of interest from the listing of items.

18. The system of claim 17, wherein removing the media item of interest from the listing of items further comprises initiating removal of a copy of the media item of interest from a data store, the copy of the media item of interest being specific to the folder.

19. The system of claim 17, wherein removing the media item of interest from the listing of items further comprises initiating removal of a reference to a copy of the media item of interest from a data store, the copy of the media item of interest being shared by a plurality of folders, individual ones of the plurality of folders being associated with respective ones of a plurality of users.

20. The system of claim 14, wherein, when executed, the at least one application further causes the at least one computing device to at least:
   receive a request to preview the media item of interest from the client; and
   send a portion of the media item of interest to the client.

\* \* \* \* \*